(12) United States Patent
Wagner

(10) Patent No.: US 6,939,507 B2
(45) Date of Patent: Sep. 6, 2005

(54) CUTTER DUPLICATION APPARATUS

(76) Inventor: Jefferson Louis Wagner, 354 Lynwood Dr., Charleston, SC (US) 29414

( * ) Notice: Subject to any disclaimer, the term of this patent is extended or adjusted under 35 U.S.C. 154(b) by 190 days.

(21) Appl. No.: 10/379,039

(22) Filed: Mar. 4, 2003

(65) Prior Publication Data

US 2004/0173952 A1 Sep. 9, 2004

(51) Int. Cl.[7] .............................................. B23K 37/00
(52) U.S. Cl. .......................................... 266/63; 266/64
(58) Field of Search ............................... 266/48, 63, 64

(56) References Cited

U.S. PATENT DOCUMENTS

| 400,268 A | 3/1889 | Thompson |
|---|---|---|
| 528,337 A | 10/1894 | Morgeneier |
| 1,396,993 A | 11/1921 | Carter |
| 1,582,033 A | 4/1926 | Godfrey |
| 1,844,574 A | 2/1932 | Hancock |
| 2,040,914 A | 5/1936 | Anderson |
| 2,170,876 A | 8/1939 | Shorter |
| 2,178,938 A | 11/1939 | Ohmstede |
| 2,321,949 A | 6/1943 | Sorensen |
| 2,494,532 A | 1/1950 | Ager |
| 2,587,232 A | 2/1952 | Schmader |
| 2,693,737 A | 11/1954 | Smith |
| 3,075,758 A | 1/1963 | Gloor |
| 3,417,477 A | 12/1968 | Nowotny |
| 3,660,665 A | 5/1972 | Luker |
| 4,333,635 A * | 6/1982 | Koukal ........................ 266/64 |
| 5,165,175 A | 11/1992 | Anderson |
| 6,576,183 B1 * | 6/2003 | Thomas ........................ 266/64 |

* cited by examiner

Primary Examiner—Scott Kastler
(74) Attorney, Agent, or Firm—The Harleston Law Firm, LLC; Kathleen M. Harleston

(57) ABSTRACT

An apparatus for cutting a duplicate form includes:
a) a rack portion including a frame, a screen supported on the frame, and an arm support extension extending from the frame; the frame including an upper, generally horizontally oriented upper frame portion, and at least two corner frame members extending; and
b) a movable arm portion pivotally connected to the arm support extension; the arm portion including a movable torch support arm segment including a cutting torch support mechanism, and a movable stylus support arm segment including a stylus support mechanism; a first end of the torch support arm segment being extendible into a central area of the frame below the upper frame portion; a first end of the stylus support arm segment being extendible above the upper frame portion and above the torch arm support segment. Also included is a method for cutting a duplicate of a template form.

20 Claims, 8 Drawing Sheets

CUTTER DUPLICATION APPARATUS

BACKGROUND OF THE INVENTION

1. Technical Field

The present invention relates generally to an apparatus for copying and cutting duplicate forms in a conductive material, more particularly a metal plate or sheet.

2. Background Information

It is difficult and can be dangerous to use a cutter torch free-hand to cut out a precise pattern on a metal sheet or the like. It is also difficult to cut multiple identical parts, even where a metal template form is available. A need exists for an easy to use cutter apparatus for quickly and safely duplicating metal forms or the like in a conductive plate. The apparatus of the present invention satisfies this need. A plasma cutter torch traces better when it is on the arm of the present invention. The arm of the present apparatus steadies the cutting torch so that it can be used more precisely. With the present invention, multiple duplicate parts can be created from a metal sheet safely, quickly and easily. The present apparatus is simple and inexpensive to manufacture, and is easy to store and transport.

BRIEF SUMMARY OF THE INVENTION

The present invention is an apparatus for cutting a duplicate form, comprising:

a) a rack portion comprising a frame, screen, and an arm support extension; the frame comprising an upper, generally horizontally oriented upper frame portion, and at least two corner frame members extending in a generally downward direction from the upper frame portion; the generally horizontally oriented screen being supported by the upper frame portion; the arm support extension extending from at least a portion of the frame; and b) a movable arm portion pivotally connected to the arm support extension; the arm portion comprising a movable torch support arm segment and a movable stylus support arm segment; a first end of the torch support arm segment being extendible into a central area of the frame below the upper frame portion; a first end of the stylus support arm segment being extendible above the upper frame portion and above the torch arm support segment; the stylus support arm segment comprising a stylus support mechanism for supporting a removable stylus; an opposite, second end portion of the torch support arm segment comprising a cutting torch support mechanism.

The present invention also includes a method for cutting a duplicate of a form. The method includes the following steps:

a) removably engaging a template form on a screen of an upper frame portion of a cutter duplication apparatus, and a metal sheet on a lower frame portion of the cutter duplication apparatus;

b) outlining the template form using a stylus on a movable stylus support arm segment of the cutter duplication apparatus;

c) at about the same time, operating a cutting torch supported on a torch support arm segment of the cutter duplication apparatus, such that the cutting torch cuts the duplicate form into the metal sheet, the stylus support arm segment being above the torch support arm segment in the apparatus;

d) turning off the cutting torch;

e) moving the torch support arm segment and the stylus support arm segment to a side of the cutter duplication apparatus; and f) disengaging the duplicate form and the remainder of the metal sheet from the lower frame portion, and the template form from the upper frame portion.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
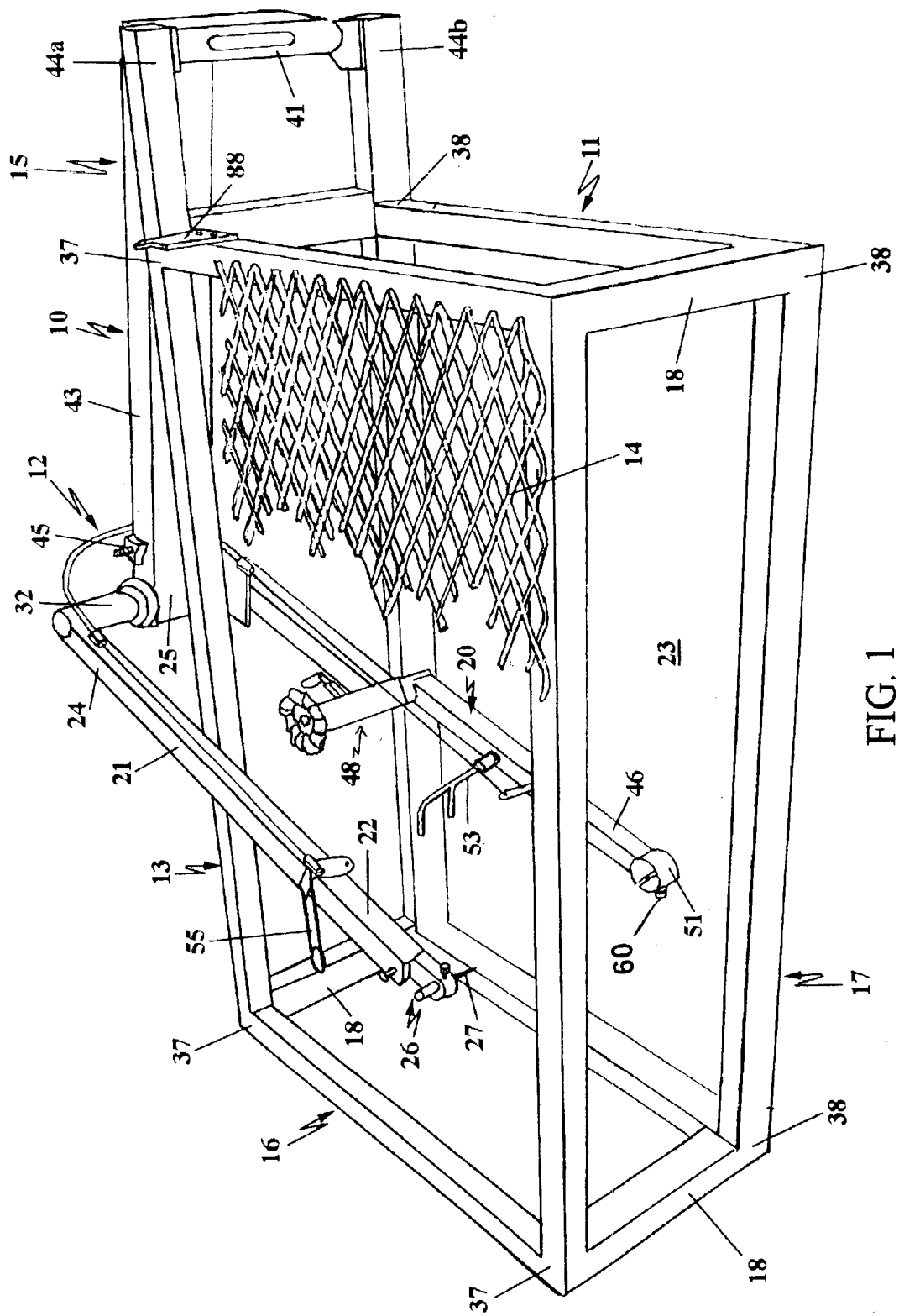
FIG. 1 is a perspective view of a cutter duplication apparatus according to the present invention, shown without a plasma cutter.

In the following description, like reference characters designate like or corresponding parts throughout the several views. Also, in the following description, it is to be understood that such terms as "front," "rear," and the like are words of convenience and are not to be construed as limiting terms. Referring in more detail to the drawings, the invention will now be described.

Referring to FIG. 1, a cutter apparatus for duplicating forms, which is generally shown at 10, is constructed in accordance with the present invention. The cutter duplication apparatus 10 basically includes two portions: a rack portion 11, the bottom of which is preferably placed on a flat surface, and a movable arm portion 12, which is connected to the rack portion 11. The rack portion 11 supports a template form, and the arm portion 12 supports a stylus for tracing the desired template forms and a cutting tool, preferably a cutting torch, for safely cutting the shapes of the template forms into a metal plate or sheet. The template forms can be made of metal, plastic, wood, or any other suitable material.

As shown in FIG. 1, the rack portion 11 is comprised of a frame 13, a screen 14, and a movable arm support extension 15. The frame 13 includes an upper, generally horizontally oriented frame portion 16, a lower, generally horizontally oriented frame portion 17, and at least two corner frame members 18. The corner frame members 18 support the upper frame portion 16 above, and generally parallel to, the lower frame portion 17. Although a hollow, box-shaped frame is preferred, the frame can alternatively be oval in shape, or any other suitable, desired configuration. The generally horizontally oriented screen 14 is supported by the upper frame portion 16. The movable arm support extension 15 extends from at least one corner of the frame 13.

Figure 3:
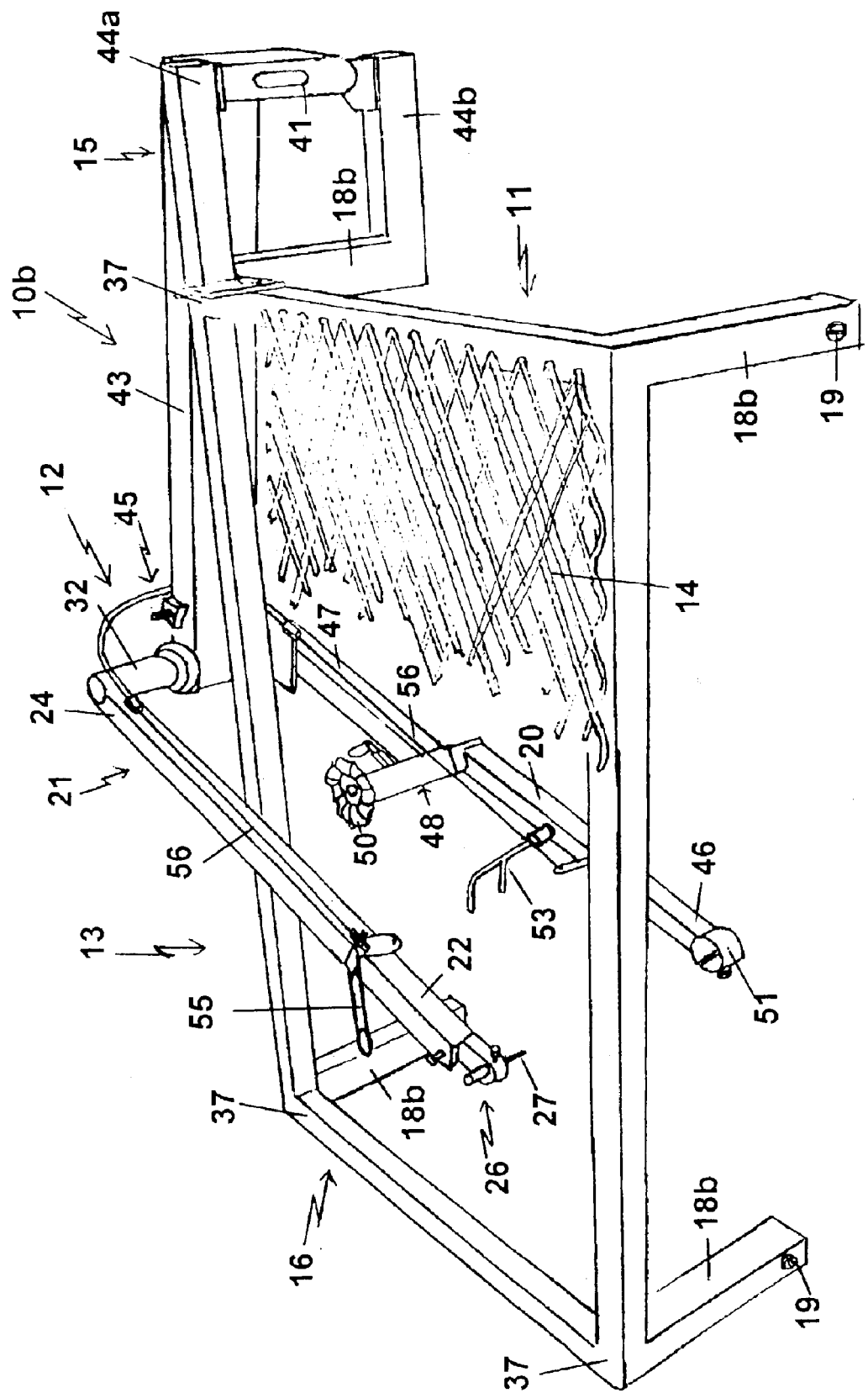
FIG. 3 is a perspective view of an alternate embodiment of a cutter duplication apparatus according to the present invention, shown without a plasma cutter.

In an alternate, second embodiment 10b shown in FIG. 3, the frame 13 does not include a lower frame portion. The advantage of this embodiment is that the rack portion 11 can be set directly on a very large sheet of steel or other metal material, rather than having to perch the metal sheet between the corner members (where they connect to the lower frame portion). This cutter duplication apparatus 10b can be moved from place to place on the large metal sheet, rather than having to move the metal sheet within the cutter duplication apparatus 10.

In this second embodiment 10b, a lower frame portion 17 is re-attachable as desired, with screws, bolts, or any other suitable means of detachably attaching a lower frame portion 17, as seen in FIG. 1, to the upper frame portion 16. Three or four of the corner frame members 18b in this embodiment 10b have a hole 19 at the bottom for accommodating such screws or bolts. In use, the upper frame portion is placed over the lower frame portion and the bolts are inserted through corresponding holes 19 in the corner frame members 18b and the corners 38 of the lower frame portion 17. The first embodiment 10 herein is preferred, for example, for doing odd jobs, where scraps of steel or other metal are used as the sheet material.

Figure 2:
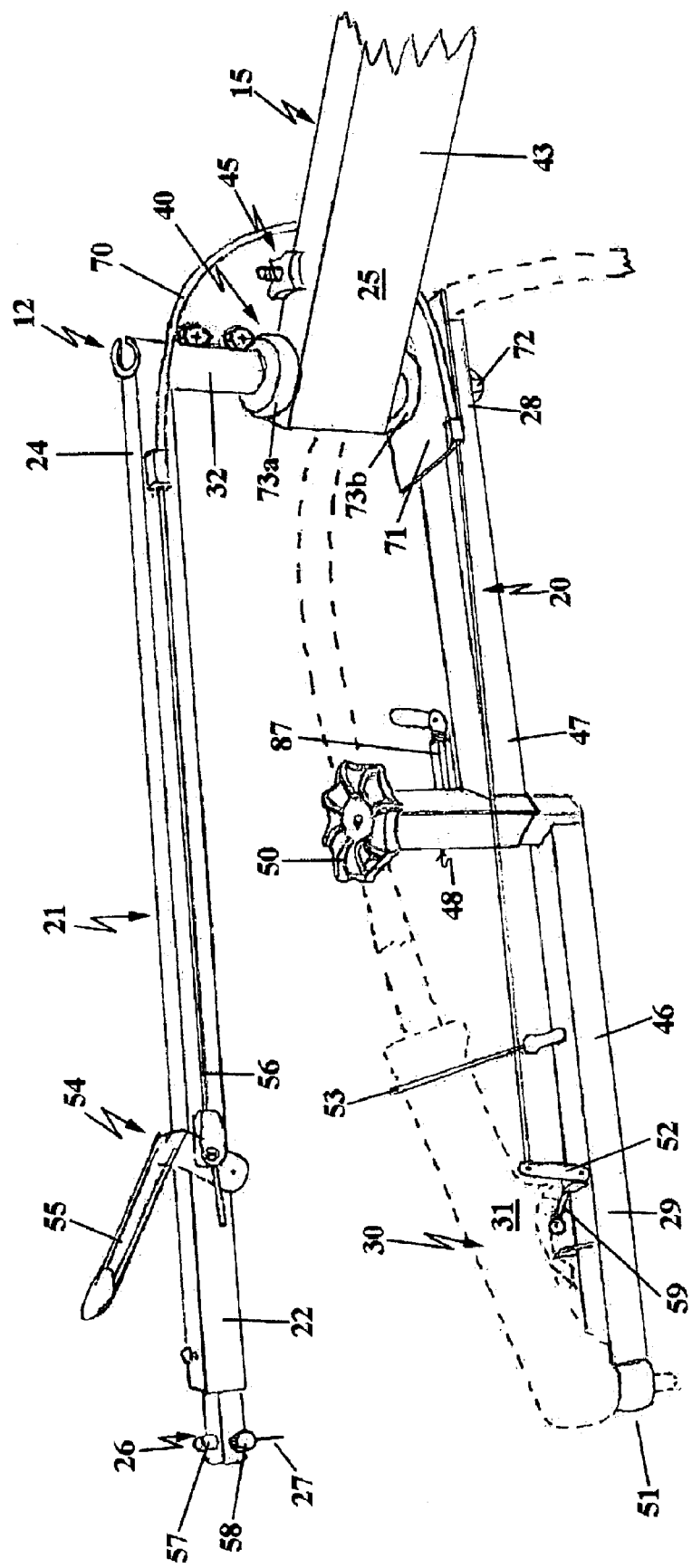
FIG. 2 is a perspective view of a portion of an arm support extension of a cutter duplication apparatus according to the present invention, shown with a plasma cutter in outline.

In the first, preferred embodiment shown in FIGS. 1 and 2, the arm portion 12 is pivotally connected to the arm support extension 15. The arm portion 12 includes a movable torch support arm segment 20 and a movable stylus support arm segment 21. As illustrated in FIG. 1, the stylus support arm segment 21 extends above the upper frame portion 16 and above the torch support arm segment 20. As shown in FIG. 2, a first, "free" end 29 of the torch support arm segment 21 extends into a central area 23 within the frame 13 below the upper frame portion 16. As depicted in FIGS. 1 and 2, the first end portion of the stylus support arm segment includes a stylus support mechanism 26 for supporting a removable stylus 27. A second, opposite end 24 of the stylus support arm segment 21 is connected to a compression mounting tube 32, which is connected to an end 25 of the arm support extension 15. An opposite, second end 28 of the torch support arm segment 20 is also connected, directly or indirectly, to an end of the arm support extension 15. The first end portion 29 of the torch support arm segment 20 includes a torch support mechanism 30 for supporting a cutting torch 31, shown in FIG. 2 in outline, preferably a plasma cutting torch or the like.

Continuing with the rack portion 11 of the first, preferred embodiment 10, shown in FIG. 1, the rectangular-shaped upper frame portion 16 is made up of two parallel, longitudinal upper frame members of substantially equal length, and two shorter latitudinal upper frame members of substantially equal length. The latitudinal upper frame members connect corresponding ends of the longer longitudinal frame members to one another. The rectangular-shaped lower frame portion 17 is made up of two parallel, longitudinal lower frame members of substantially equal length, and two shorter latitudinal lower frame members of substantially equal length. The latitudinal lower frame members connect corresponding ends of the longer longitudinal lower frame members to one another. The lower frame portion is preferably the same size as the upper frame portion. In this preferred embodiment, the four corner frame members 18 connect the four corners 37 of the upper frame portion 16 to the corresponding four corners 38 of the lower frame portion 17.

Continuing with FIGS. 1 and 2, the arm support extension ends of the torch support arm segment 20 and the stylus support arm segment 21 are each pivotally connected to the end portion 25 of the arm support extension 15 by a pivot mechanism 40. The pivot mechanism connects a movable anterior arm extension portion 43 of the arm support extension 15 to a rigid posterior arm extension portion 44 of the arm support extension 15. The rigid posterior arm extension portion 44 is connected at one end to corresponding corners 37, 38 of the upper and lower frame portions. The rigid posterior arm extension portion 44 is comprised of two matching, parallel rigid arm extension segments, an upper rigid arm extension segment 44a extending from the upper frame portion corner, and a lower rigid arm extension segment 44b extending from the lower frame portion corner. Opposite ends of the rigid arm extension segments 44 are connected to opposite ends of a ball bearing housing 41. The movable anterior arm extension portion 43 preferably comprises an arm locking mechanism 45.

As shown in FIGS. 1 and 2, the torch support arm segment 20 is comprised of an anterior torch arm segment 46 and a posterior torch arm segment 47, with a height adjustment mechanism 48 between them for adjusting the height of the anterior torch arm segment. The height adjustment mechanism 48 connects an anterior end of the posterior torch arm segment 47 to a posterior end of the anterior torch arm segment 46. To use the height adjustment mechanism 48, the user rotates the knurled knob 49 to raise or lower the anterior torch arm segment 46.

The torch support arm segment 20 also includes the torch support mechanism 30, which includes a cutter head support band 51, as shown in FIG. 2. The torch support mechanism 30 further includes a cutter head locking mechanism 60 (see FIG. 1) for locking a tip of the cutting torch 31 in the cutter head support band for safety during use of the cutting torch. The torch support mechanism 30 further includes a torch trigger mechanism 52, and a torch handle holder 53. The torch trigger mechanism 52 preferably includes a trigger roller 59 for depressing the torch trigger, thus starting the cutting torch 31.

As shown in FIG. 2, the stylus support arm segment 21 has a cable mechanism 54, which includes a movable stylus arm lever 55 mounted on an upper part of the stylus support arm segment, and a cable 56. The cable 56 extends along a side of the stylus support arm segment 21. The stylus support mechanism 26 includes a stylus holder 57 for supporting the stylus, and a user-accessible stylus screw 58 for tightening the stylus 27 in its holder. The user loosens the stylus screw 58 in order to remove the stylus 27, as desired.

In use, the user attaches a template form to the upper frame portion 16, preferably with at least one magnet, and lays the desired metal material, preferably a sheet of steel, on the lower frame member 17. The metal template form is above the cutting torch 31, so the cutting torch is visible below, even while the template form is being outlined with the stylus 27. The superior template form also provides protection from sparks and heat from the inferior cutting torch 31 during use. By using peripheral vision during use, a user can watch the stylus 27 and the cutting torch 31 of the present invention at the same time. This also allows for a more compact apparatus for easy transport and storage (since not as much shelf space is required).

Advantages of the apparatus of the present invention also include the following:

1. It allows a cleaner cut, so that more complicated cuts of conductive material, such as steel, can be achieved.
2. Since it is easy to use, only a minimum of experience is required to operate the present apparatus.
3. With the present invention, no alterations to the plasma cutting torch are required.
4. The preferred ball bearings in the pivot mechanism of the cutter duplication apparatus allow smooth movement of the arm segments.
5. Set up time is short.
6. Its simple design makes the apparatus simple and inexpensive to manufacture.
7. The apparatus is compact and easy to store and transport.

Also included within the present invention is a method for cutting a duplicate of a form. The method includes the steps of:

a) removably engaging a template form on a screen of an upper frame portion of a frame of a cutter duplication apparatus, and a metal sheet on a lower frame portion of the cuter duplication apparatus frame;
b) outlining the template form using a stylus on a movable stylus arm segment of the cutter duplication apparatus;
c) at generally the same time, operating the cutting torch such that the torch cuts the same form into the metal sheet below the stylus, the cutting torch being supported on a torch arm segment;
d) disengaging a tip of the cutting torch from the metal sheet; and
e) moving the torch arm segment to a side of the metal sheet, and the stylus arm segment to a side of the screen; and
f) disengaging the metal form and the remainder of the metal sheet from the lower frame portion, and the template form from the upper frame portion.

Figure 4:
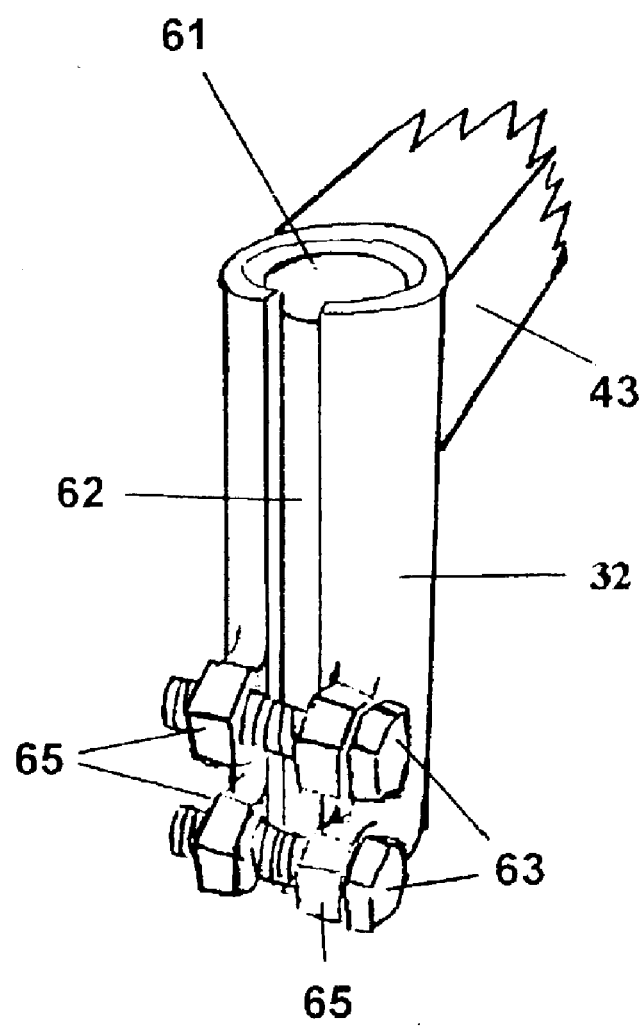
FIG. 4 is a perspective view of a portion of the cutter duplication apparatus according to FIG. 1.

Turning now to FIG. 4, a pivot point of the arm support extension 15 is shown. The end of the arm support extension 25 holds a compression mounting tube 32. The anterior arm extension portion 43 extends out in a generally horizontal direction from the generally vertically oriented compression mounting tube 32. A pivot bar 61 extending through a central hollow of the compression mounting tube 32 allows the stylus support arm segment to pivot around the pivot bar. This allows the plane of travel of the stylus support arm segment 21 to be true, which is particularly advantageous while the stylus 27 is being used to outline the curves or corners of a metal form. Along one side of the compression mounting tube 32 is a generally vertically oriented slot 62. Bolts 63 through apertures 64 in extensions 65 at one end of the slot 62 allow the user to adjust the pivot.

The pivot bar 61 allows the user to adjust the height of the stylus support arm segment 21 to, for example, accommodate thicker template forms. To raise (or lower) the stylus support arm segment 21, the user loosens bolts 63 and pulls up (or drops) the compression mounting tube 32 to the desired height (see FIG. 4). The user then tightens the bolts 63 before using the stylus 27.

Similarly, the cutter head locking mechanism 60 may include screws across an aperture in the cutter head band 51, as shown in FIG. 1. Rotating the cutter head locking mechanism screw(s) loosens or tightens the cutter head band 51 around the tip of the cutting torch 31 (also see FIG. 2).

Alternatively, once the bolts 63 on the compression mounting tube 32 are loosened, the lower torch support arm segment 20 can be grasped and pushed away from the upper stylus support arm segment 21 and moved to a desired position independent of the stylus support arm segment. This feature of the present apparatus 10 allows a user to use the cutting torch 31 independent of the rack portion 11 and stylus 27. For example, the user can push the torch support arm segment to a directly opposing position (so that it forms a 90 to 180 degree angle, for example) from the stylus support arm segment 21. The cutting torch 31 on the torch support arm segment 20 can then be used to cut the steel sheet or perfect the duplicate form without the screen 14 and the stylus support arm segment 21 in the way.

Figure 5:
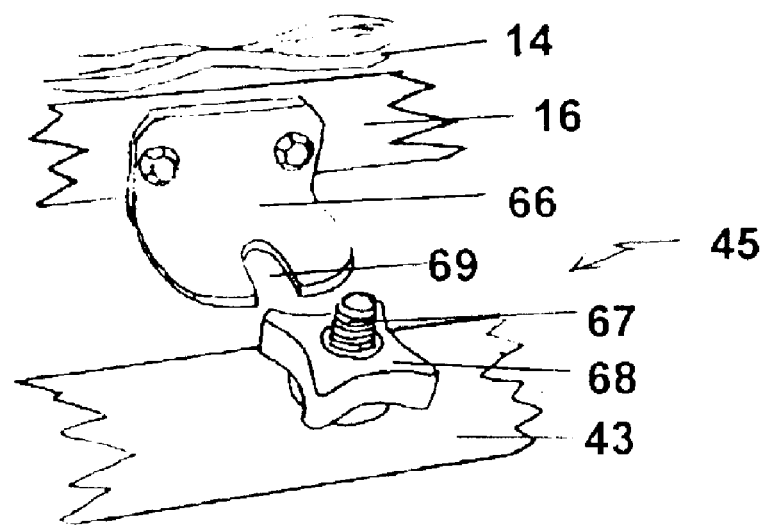
FIG. 5 is a perspective view of a portion of a cutter duplication apparatus according to the present invention.

Referring to FIG. 5, a locking plate 66 attached to an edge of the upper frame portion 16 allows the anterior arm extension portion 43 to be locked down. When it is locked down, the arm support extension 15 cannot move, which is advantageous during transport or storage. The arm, stylus, etc. are less likely to be damaged while the arm is locked. Also, the person moving the cutter duplication apparatus 10 is less likely to be injured, and adjacent property is less likely to be damaged when the arm support extension is locked. The arm locking mechanism 45 includes a lock screw 67 projecting in a generally upward direction from the upper edge of the anterior arm extension portion 43, and a lock wing nut 68 on the lock screw 67.

Continuing with FIG. 5, in order to lock the arm support extension, the user pushes the anterior arm extension portion 43 over to the upper frame portion 16 of the rack portion 11, and pushes the portion of the shaft of the lock screw 67 below the lock nut into a notch 69 in the lock plate 66. The user then rotates the lock wing nut 68, turning it down onto the lock plate 66 until the locking plate is tightly bound. Thus, when the arm locking mechanism is in a locked position, the lock wing nut 68 and the lock screw 67 contact the locking plate 66. To unlock the arm support extension, the user simply rotates the lock wing nut 68 in the opposite direction, and pulls the anterior arm extension portion 43 away from the lock plate 66.

Figure 6:
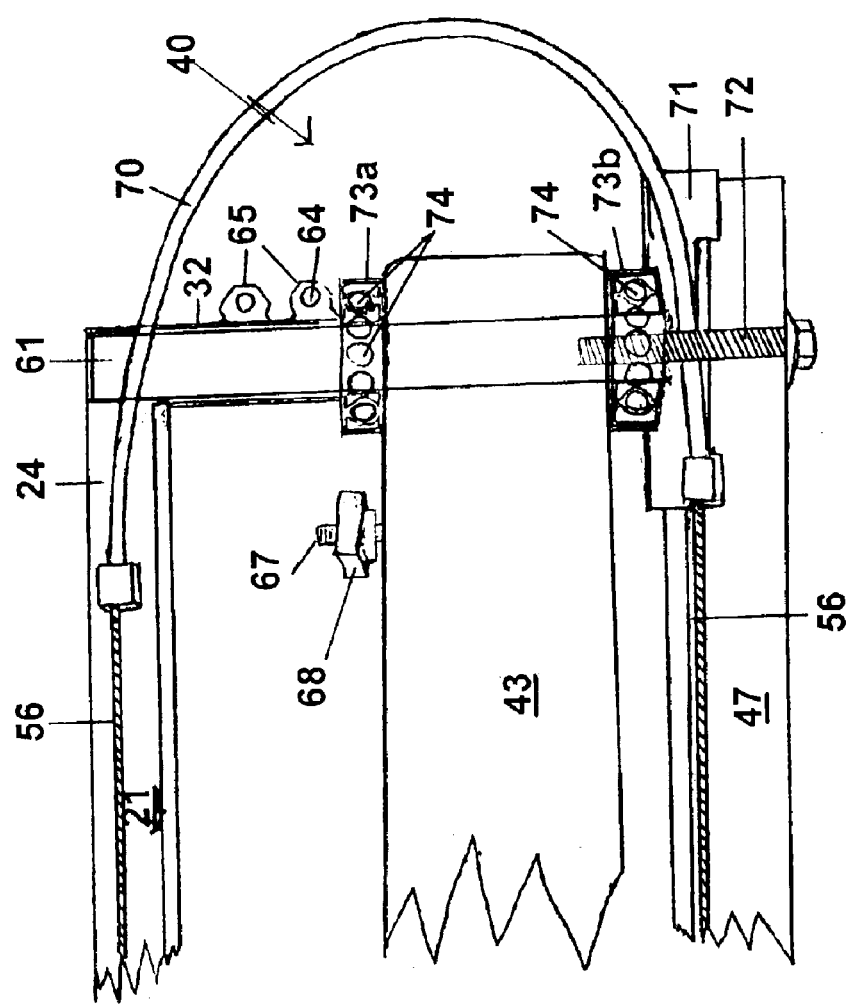
FIG. 6 is a partial longitudinal cross-sectional view of a portion of the cutter duplication apparatus according to FIG. 1.

In FIG. 6, the juncture of the stylus support arm segment 21 and the torch support arm segment 20 with the anterior arm extension portion 43 is shown. The cable 56 that extends along the side of the upper stylus support arm segment 21 curves down to the torch support arm segment 20. The cable 56 also extends along the length of the torch support arm segment 20. Where it curves, the cable 56 passes through, and is enclosed by, a cable sheath 70, as shown in FIG. 6. At least two generally circular, matching ball bearing chambers 73 include a plurality of same-sized, side by side ball bearings 74. A first one 73a of the ball bearing chambers extends between the compression mounting tube 32 and an upper side of the anterior arm extension portion 43. A second one 73b of the ball bearing chambers extends between a lower side of the anterior arm extension portion 43b and an upper side of the end portion of the posterior torch support arm segment 47.

As shown in FIG. 6, the pivot bar 61 movably passes through an aperture in the end portion of the anterior arm extension portion 43. The pivot bar ends within the end portion 24 of the stylus support arm segment 21. The opposite, lower end of the pivot bar 61 is welded onto an upper side of a torch support arm plate 71. The lower side of the torch support arm plate 71 is attached to the torch support arm segment 20. A pivot bar bolt 72 passes through an aperture in the posterior torch arm segment 47 from the underside of the posterior torch arm segment. An end portion of the pivot bar bolt shaft screws into the lower end of the pivot bar 61. The pivot bar bolt 72 also passes through the center of the first ball bearing chamber 73b between the torch support arm plate 71 and the end of the ball bearing chamber. The second ball bearing chamber 73b lies adjacent to a lower side of the anterior arm extension portion 43. Above the anterior arm extension portion 43, the pivot bar 61 extends through the matching, circular-shaped first ball bearing chamber 73a, which lies adjacent to an upper side of the anterior arm extension portion 43.

Figure 7:
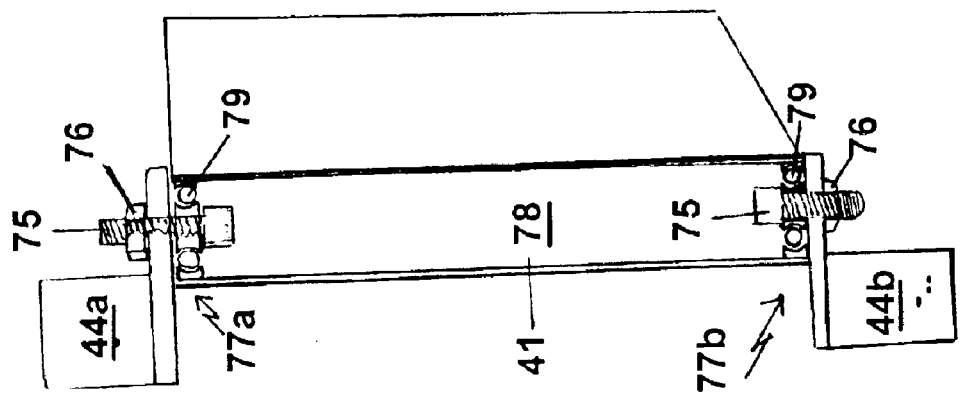
FIG. 7 is a partial longitudinal cross-sectional view of a portion of the cutter duplication apparatus according to FIG. 1.

Turning to FIG. 7, the ball bearing housing 41 allows the anterior arm extension portion 43 to pivot about the stationary posterior arm extension portion 44. The hollow ball bearing housing 41 is supported between the upper and lower posterior arm extension portions 44a, 44b by hex cap screws 75 extending through apertures in opposite ends of the ball bearing housing 41. A nut 76 on each of the screw shafts outside the ball bearing housing support the hex cap screws 75. The ball bearing housing screws 75 also pass through the center of circular-shaped ball bearing chambers 77 at either end of the tube-shaped hollow 78 in the ball bearing housing 41. These ball bearing chambers 77 hold a number of ball bearings 79, which allow for smooth movement of the anterior arm extension portion 43. Since the anterior arm extension portion 43 supports the stylus support arm segment 21 and the torch support arm segment 20, jerky movement of the anterior arm extension portion would interfere with tracing of the template form by the stylus and cutting of the metal sheet using the cutting torch. These upper and lower ball bearing chambers 77a, 77b are somewhat larger in size than the ball bearing chambers 73a, 73b, and hold smaller ball bearings than the larger ball bearings 74 in the larger chambers. These smaller ball bearings 79 also lie side by side within each ball bearing chamber 77a, 77b.

Figure 8:
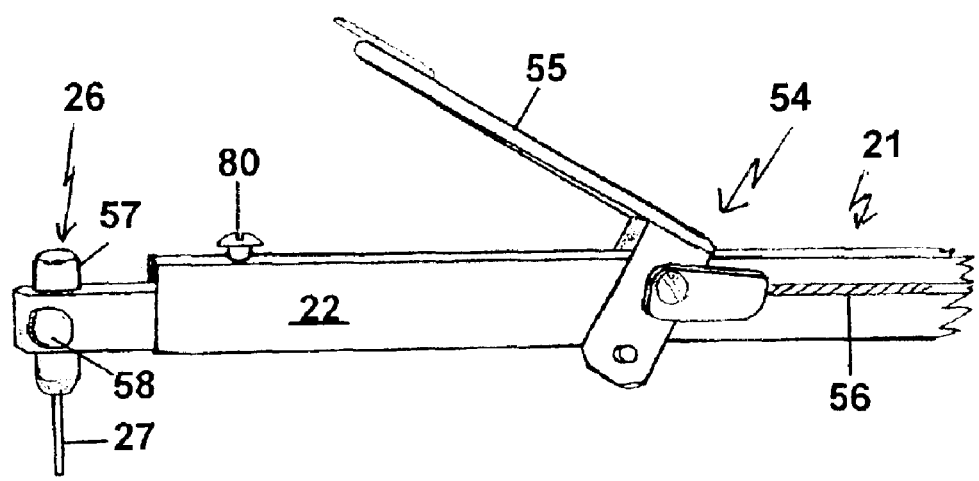
FIG. 8 is a perspective view of a portion of a stylus support arm segment of a cutter duplication apparatus according to the present invention.

Turning to FIG. 8, the free end 22 of the stylus support arm segment 21 holds the stylus support mechanism 26. One end of the stylus support mechanism 26 is affixed to the end 22 of the stylus support arm segment by a stylus set screw 80. The stylus support mechanism 26 includes a stylus holder 57. Prior to use of the cutter duplication apparatus 10, the stylus 27 is inserted into the lower end of the stylus holder and the stylus screw 58 is tightened by the user to maintain the stylus 27 in the stylus holder. The stylus 27 is used to trace the edges of the template form.

Figure 9:
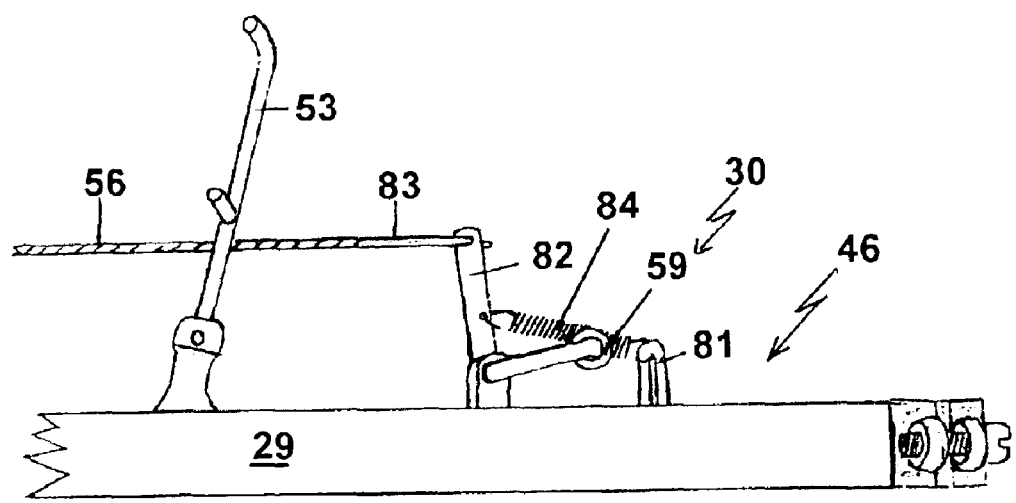
FIG. 9 is a perspective view of a portion of a cutter duplication apparatus according to the present invention.

Referring to FIGS. 8 and 9, the lever 55 on the stylus support arm segment 21 is connected to the cable 56, and the cable 56 extends along the stylus support arm segment and down to the torch support arm segment 20 (see FIG. 8). The cable 56 is pinned along a substantial portion of the torch support arm segment 20, ending at the torch support mechanism 30 (see FIG. 9). The end 83 of the cable 56 is attached to a spring-loaded lever 82 for depressing the cutting torch trigger. When the cutting torch 31 is in place, its trigger rests on the trigger roller 59, which is connected to the spring-loaded lever. The torch support mechanism 30 further includes a stationary torch safety prop 81 to which is attached an opposite end of the spring 84 on the spring-loaded lever 82. A generally fork-shaped torch handle holder 53 supports the cutting torch handle on the torch support arm segment (see FIG. 9). The safety of the cutting torch rests against the torch safety prop 81, which is a part of the torch support mechanism 30 (see FIG. 9). The cutter head support band 51 supports the tip of the cutting torch, as shown in FIG. 2.

In use, depression of the stylus arm lever 55 on the stylus support arm segment 20 pulls the cable 56 (see FIG. 8), which pulls the spring-loaded lever 82 on the torch support arm segment 20. Pulling the spring-loaded lever 82 pulls the trigger roller 59 up, which depresses the torch trigger. This lights the cutting torch. Thus, depressing the stylus arm lever 55 starts the cutting torch 31 (see FIG. 2).

Figure 10:
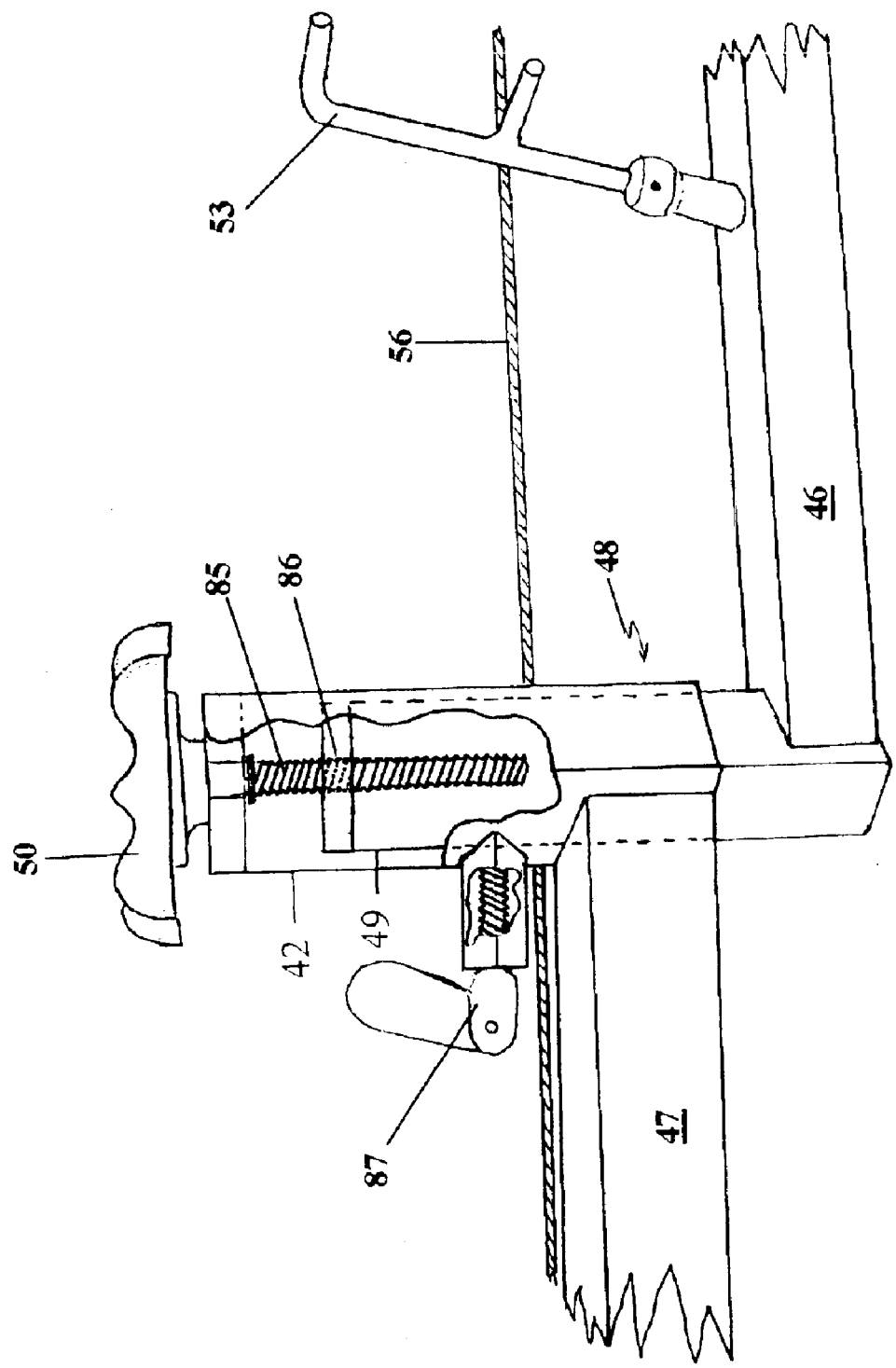
FIG. 10 is a perspective view of a height adjustment mechanism of a cutter duplication apparatus according to the present invention, showing a cutaway.

Turning to FIG. 10, the height adjustment mechanism 48 of a cutter duplication apparatus 10 is between the anterior torch arm segment 46 and the posterior torch arm segment 47. The height adjustment mechanism 48 comprises: a knurled knob 50, a threaded rod 85, a steel plate cap 86 at the top of an upright end segment 49 of the anterior torch arm segment 46, and an upright end segment 42 of the posterior torch arm segment 47. A projection at the bottom of the knurled knob 50 is connected to the upper end of the threaded rod 85. The lower end of the threaded rod 85 extends through a threaded hole in a steel plate cap 86 covering the upper end of a generally hollow, vertically oriented end segment 49 of the generally horizontally oriented anterior torch arm segment 46. The upright anterior end segment 49 extends into a generally hollow, vertically oriented end segment 42 of the generally horizontally oriented posterior torch arm segment 47 from the bottom.

In use, when the knurled knob 50 is turned in a clockwise or counterclockwise direction, the threaded rod 85 moves up or down (depending on the direction of the turn). Movement of the threaded rod 85 pulls the steel plate cap 86 on the upright anterior end segment 49 up or down, respectively, which raises or lowers the anterior torch arm segment 46, which raises or lowers, respectively, the cutting torch.

Figure 11:
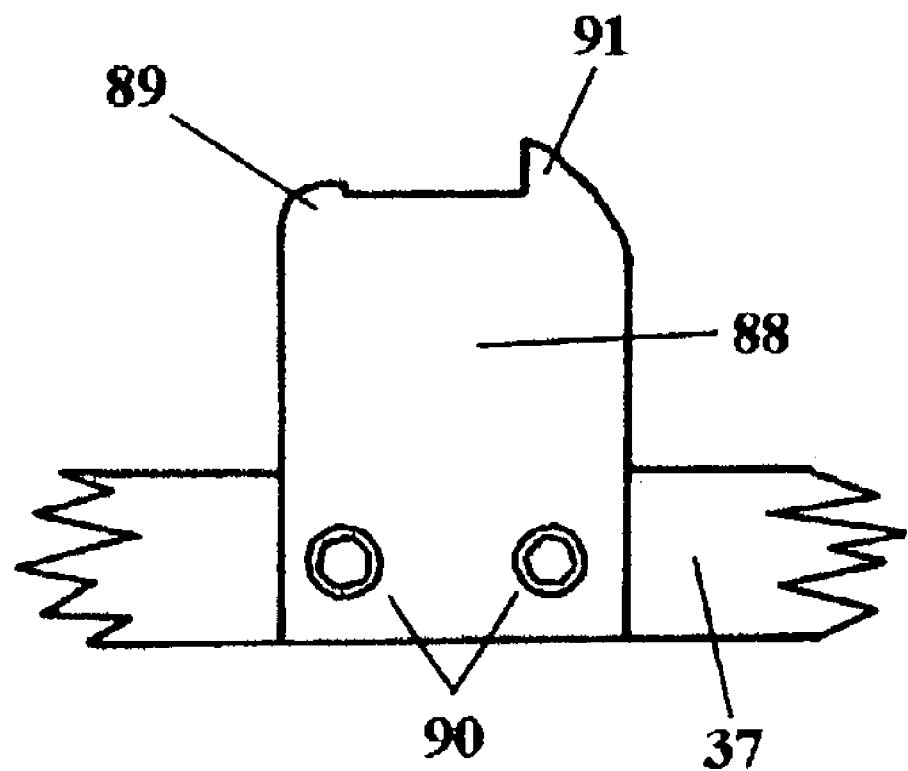
FIG. 11 is an elevational view of a stylus arm latch mechanism of a cutter duplication apparatus according to the present invention.

Turning to FIG. 11, a second arm locking mechanism comprises a stylus arm latch plate 88, a bottom end portion of which is attached by latch plate screws 90, or other suitable means, to the outside edge of the upper frame portion 16 at its corner 37, adjacent to the upper arm extension portion 44a. The stylus arm latch plate 88 projects upwardly above the screen 14. The stylus arm latch plate has a slight projection 89 along its top edge.

To use this second locking mechanism illustrated in FIG. 11, the stylus support arm segment 21 is pushed over to the stylus arm latch plate 88, and over the projection 89, stopping at a stop 91. Stop 91 is a second, higher projection, also from the upper edge of the stylus arm latch plate. The stylus support arm segment is held in place between the projection 89 and the stop 91. This prevents the wind, slight movements, etc. from moving the stylus arm segment. The stylus support arm segment 21 is connected to the torch support arm segment 20, so the two move together. Because of the smooth glide afforded by the ball bearings at the first and second pivot points along the arm portion, the stylus support arm segment and the torch support arm segment are quite responsive to movement. A slight breeze or movement in the room the apparatus 10 is in can therefore easily move the support arm segments 20, 21. This second locking mechanism prevents such inadvertent movement of the support arm segments 20, 21. The stylus support arm segment, and therefore the torch support arm segment, can easily be unlocked by lifting the stylus support arm segment 21 slightly, and pushing it away from the stylus arm latch plate 88.

An optional tension lock screw 87, which projects from the side of the upright posterior end segment 42, allows the user to lock down the height adjustment mechanism 48 once the height has been adjusted as desired. To lock the tension lock screw 87, the user turns a head of the tension lock screw, shown in cutaway. The opposite, threaded end of the tension lock screw then tightens onto the upright anterior end segment 49, preventing the upright anterior end segment 49 from moving until the tension lock screw is loosened.

From the foregoing it can be realized that the described tool of the present invention may be easily and conveniently utilized for cutting a duplicate of a desired form into a metal sheet. While preferred embodiments of the invention have been described using specific terms, this description is for illustrative purposes only. It will be apparent to those of ordinary skill in the art that various modifications may be made without departing from the spirit or scope of the invention, and that such modifications are intended to be within the scope of the present invention.

What is claimed is:

1. An apparatus for cutting a duplicate form, the apparatus comprising:
   a) a rack portion comprising a frame, screen, and an arm support extension; the generally horizontally oriented screen being supported by the frame; the arm support extension extending from at least a portion of the frame; and
   b) a movable arm portion pivotally connected to the arm support extension; the arm portion comprising a movable torch support arm segment and a movable stylus support arm segment; a first end of the torch support arm segment being extendible into a central area of the frame; a first end of the stylus support arm segment being extendible above the frame and above the torch arm support segment; the stylus support arm segment comprising a stylus support mechanism for supporting a removable stylus; an opposite, second end portion of the torch support arm segment comprising a cutting torch support mechanism;
   wherein the frame further comprises an upper, generally horizontally oriented upper frame portion, and at least two corner frame members extending in a generally downward direction from the upper frame portion; a lower, generally horizontally oriented frame portion; four generally vertical ones of the corner frame members supporting the upper frame portion above, and generally parallel to, the lower frame portion.

2. The apparatus according to claim 1, wherein the second end of the torch support arm segment is connected, directly or indirectly, to the arm support extension, and an opposite, second end of the stylus support arm segment is connected, directly or indirectly, to the arm support extension.

3. The apparatus according to claim 1, wherein the frame further comprises an upper, generally horizontally oriented upper frame portion, and at least two corner frame members extending in a generally downward direction from the upper frame portion; a lower, generally horizontally oriented frame portion; four generally vertical ones of the corner frame members supporting the upper frame portion above, and generally parallel to, the lower frame portion.

4. An apparatus for cutting a duplicate form, the apparatus comprising:
   a) a rack portion comprising a frame, screen, and an arm support extension; the generally horizontally oriented screen being supported by the frame; the arm support extension extending from at least a portion of the frame; and
   b) a movable arm portion pivotally connected to the arm support extension; the arm portion comprising a movable torch support arm segment and a movable stylus support arm segment; a first end of the torch support arm segment being extendible into a central area of the frame; a first end of the stylus support arm segment being extendible above the frame-and above the torch arm support segment; the stylus support arm segment comprising a stylus support mechanism for supporting a removable stylus; an opposite, second end portion of the torch support arm segment comprising a cutting torch support mechanism;
   wherein the second end of the torch support arm segment is connected, directly or indirectly, to the arm support extension, and an opposite, second end of the stylus support arm segment is connected, directly or indirectly, to the arm support extension; and
   wherein the torch support arm segment is comprised of an anterior torch arm segment and a posterior torch arm segment, a height adjustment mechanism connecting an anterior end of the posterior arm segment to a posterior end of the anterior torch arm segment.

5. The apparatus according to claim 4, wherein the height adjustment mechanism comprises: a knurled knob; a threaded rod connected to the knurled knob; a plate cap at the upper end of a generally hollow, vertically oriented end segment of the generally horizontal anterior torch arm segment; and a generally hollow, vertically oriented end segment of the generally horizontal posterior torch arm segment; a lower end portion of the threaded rod movably extending through a threaded central aperture in the plate cap; the end segment of the anterior torch arm segment extending into a hollow end of the end segment of the posterior torch arm segment.

6. The apparatus according to claim 1, wherein the torch support mechanism comprises a cutter head support band.

7. The apparatus according to claim 6, wherein the torch support mechanism further comprises a cutter head locking mechanism for locking a tip of the cutting torch in the cutter head support band.

8. An apparatus for cutting a duplicate form, the apparatus comprising:
   a) a rack portion comprising a frame, screen, and an arm support extension; the generally horizontally oriented screen being supported by the frame; the arm support extension extending from at least a portion of the frame; and
   b) a movable arm portion pivotally connected to the arm support extension; the arm portion comprising a movable torch support arm segment and a movable stylus support arm segment; a first end of the torch support arm segment being extendible into a central area of the frame; a first end of the stylus support arm segment being extendible above the frame-and above the torch arm support segment; the stylus support arm segment comprising a stylus support mechanism for supporting a removable stylus; an opposite, second end portion of the torch support arm segment comprising a cutting torch support mechanism;
   wherein the torch support mechanism further comprises a torch trigger mechanism, which comprises a torch trigger roller for depressing a trigger of the cutting torch.

9. The apparatus according to claim 8, wherein the torch support mechanism further comprises a torch handle holder for supporting a handle of the cutting torch.

10. The apparatus according to claim 1, further comprising a compression mounting tube connected to the second end of the stylus support arm segment, and a pivot bar extending through a central hollow of the compression mounting tube, wherein the compression mounting tube is pivotally connected to an anterior arm extension portion of the arm support extension.

11. The apparatus according to claim 10, further comprising at least two matching ball bearing chambers, each comprising a plurality of same-sized ball bearings, a first one of the ball bearing chambers extending between the compression mounting tube and an upper side of the anterior arm extension portion, a second one of the ball bearing chambers extending between a lower side of the anterior arm extension portion and an upper side of the torch support arm segment.

12. The apparatus according to claim 1, wherein the stylus support mechanism comprises a stylus holder and a user-accessible screw.

13. The apparatus according to claim 8, further comprising a cable mechanism; the cable mechanism comprising a cable and a movable lever mounted on the stylus support arm segment, the cable extending along the stylus support arm segment and the torch support arm segment, one end of the cable being attached to the lever, an opposite end of the cable being connected to the torch trigger mechanism.

14. The apparatus according to claim 1, wherein the upper frame portion is comprised of two parallel longitudinal upper frame members of substantially equal length, and two shorter latitudinal upper frame members of substantially equal length, the latitudinal upper frame members connecting opposite ends of the longitudinal frame members to one another.

15. The apparatus according to claim 1, wherein the lower frame portion is comprised of two parallel longitudinal lower frame members of substantially equal length, and two shorter latitudinal lower frame members of substantially equal length, the latitudinal lower frame members connecting opposite ends of the longitudinal frame members to one another.

16. The apparatus according to claim 14, wherein four of the corner frame members connect four corners of the upper frame portion to four corners of the lower frame portion, one corner of the upper frame portion supporting a second arm locking mechanism for locking the stylus support arm segment.

17. The apparatus according to claim 1, further comprising a substantially hollow ball bearing housing between upper and lower posterior arm extension portions of the arm support extension, the ball bearing housing comprising at least one ball bearing chamber, the ball bearing chamber containing a plurality of ball bearings.

18. The apparatus according to claim 1, wherein a posterior arm extension portion of the arm support extension is comprised of an upper rigid arm extension segment extending from the upper frame portion corner, and a lower rigid arm extension segment extending from the lower frame portion corner, opposite ends of the rigid arm extension segments being connected to opposite ends of the pivot chamber.

19. The apparatus according to claim 1, wherein a movable anterior arm extension portion of the arm support extension comprises an arm locking mechanism.

20. The apparatus according to claim 19, wherein the arm locking mechanism comprises a locking plate attached to an edge of the upper frame portion, a lock screw projecting in an upward direction from the anterior arm extension portion, and a lock wing nut on the lock screw; wherein, when the arm locking mechanism is in a locked position, the lock wing nut and the lock screw contact the locking plate.

* * * * *